May 27, 1969

E. E. HESTON ET AL 3,445,890

TWO-STAGE EXTRUDER

Filed Dec. 8, 1966

INVENTORS
EUGENE E. HESTON
JOHN F. STROUP
WILLIAM S. McCORMICK
HEINRICH J. WURGLER

BY Oberlin, Maky & Donnelly
ATTORNEYS

United States Patent Office

3,445,890
Patented May 27, 1969

3,445,890
TWO-STAGE EXTRUDER
Eugene E. Heston, Akron, John F. Stroup and William S. McCormick, Cuyahoga Falls, and Heinrich J. Wurgler, Uniontown, Ohio, assignors to NRM Corporation, Akron, Ohio, a corporation of Ohio
Filed Dec. 8, 1966, Ser. No. 600,123
Int. Cl. B29f 3/02
U.S. Cl. 18—12   12 Claims

ABSTRACT OF THE DISCLOSURE

A multi-stage extruder including a first stage provided with a transition section at the downstream end of the first stage preceded by a metering section and compression section for supplying semi-fluxed material to the transition section, such transition section having a first helical flight defining a first helical channel through which the material is advanced from the metering section, and a second helical flight defining a second helical channel, which second helical flight gradually diverges from the first helical flight to cause a progressively decreasing axial width in the first channel and a progressively increasing axial width in the second channel, and a clearance between the wall of the cylinder and the crest of the second helical flight providing restricted communication between the first and second channels for flow of material from the first channel into the second channel; and a second stage downstream of the first stage.

---

The present invention relates generally, as indicated, to a two-stage extruder, and more particularly to certain improvements in the feed screw thereof which makes it especially suited for plasticating difficult-to-melt plastics and the like.

One of the primary considerations in extruder design is to provide a machine which will produce a fully plasticated and homogeneous melt at a substantially uniform flow rate. Satisfactory results have been obtained using a single stage extruder of the type shown and described in Patent No. 3,271,819, granted to Frederick K. Lacher on Sept. 13, 1966, in which the feed screw is provided with a feed section and metering section at opposite ends and an intermediate transition section including two merging flights of different pitches having a restriction therebetween communicating one helical channel with the other to provide for increased back pressure and intensified working, heating and bulk reduction of the material as well as restricted uniform flow of refined material from one channel to the other. However, for certain materials such as low density polyethylene there is an appreciable temperature variation within the extrudate and consequently incomplete mixing, especially at high rates of flow.

It is therefore a principal object of this invention to provide an extruder and feed screw therefor which will produce a completely homogeneous extrudate at a more uniform temperature than is obtainable with the prior art extruders presently available. In general, this is achieved by providing a two-stage extruder, with a transition section in the first stage having a pair of merging flights of different pitches and a restriction between the converging channels thereof. The first stage transition section is desirably located near the end of the first stage, with a metering section and compression section immediately preceding the transition section to partially flux the material before passing through the transition section.

Yet another object is to provide such a two-stage extruder and feed screw therefor in which there is a second transition section in the second stage including a pair of merging flights of different pitches having a restriction between the channels thereof.

A further object is to provide such an extruder and feed screw therefor with a vent immediately downstream of the first stage transition section to permit the escape of moisture and volatile gases from the thin layer of melted and refined material which flows from one channel to the other.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

Figure 1:
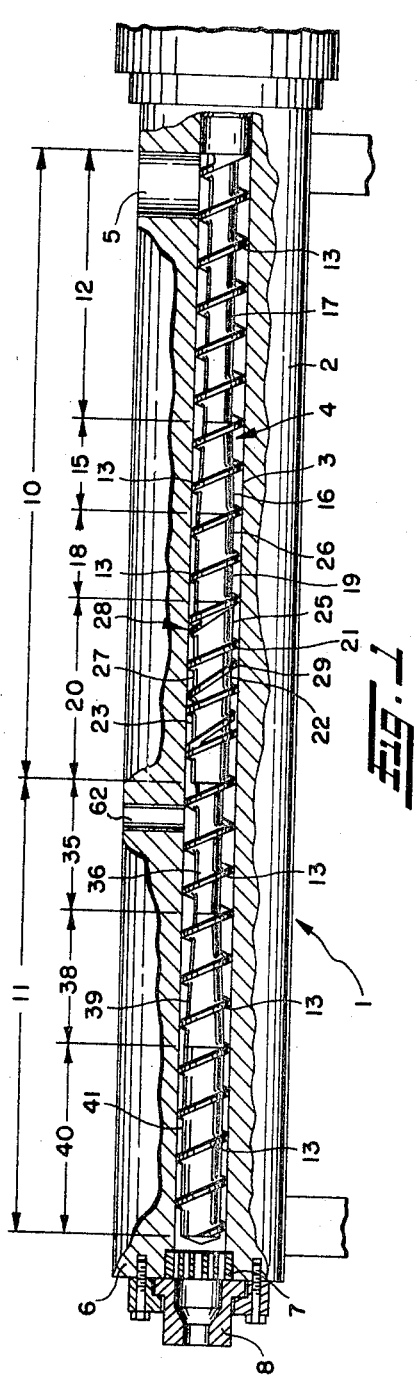
FIG. 1 is a side elevation view of a preferred form of extruder in accordance with this invention with portions of the extruder cylinder broken away to show the feed screw configuration.

Turning now to the details of the drawing and first especially to FIG. 1, a preferred form of extruder in accordance with this invention is generally indicated at 1 and comprises a cylinder assembly 2 having a longitudinal bore 3 therethrough in which is received a feed screw 4. At one end of the cylinder 2 there is a feed opening 5 into which solid plastic material in the form of pellets, granules, chips and the like may be introduced for advancement by the feed screw 4 when turned by a suitable power drive, not shown, toward the discharge end 6 of the cylinder assembly 2 for flow through the usual breaker plate and screen assembly 7 and extrusion die 8.

The feed screw 4 shown has two stages, a first stage 10 wherein the solid plastic material which is introduced through the feed opening 5 is substantially completely refined and mixed, and a second stage 11 into which the material is introduced from the first stage 10 for slight further refining and mixing but primarily cooling and pumping at a uniform rate through the breaker plate and screen assembly 7 and extrusion die 8.

In the first stage 10 adjacent the feed opening 5, there is a feed section 12 having a helical feed flight 13 of constant pitch and constant channel depth for conveying plastic material to a first compression section 15 comprising a continuation of flight 13 along an outwardly tapered portion 16 of the hub 17 of the feed screw 4. As the material passes through the first compression section 15, it is compressed and worked, during which heat is generated to cause initial melting of the plastic material.

Immediately downstream of the first compression section 15 there is a first metering section 18 comprising a further continuation of flight 13 along a uniform diameter portion 19 of the hub 17 for continually working the material received from the first compression section 15 and supplying such material under pressure in a semi-fluxed condition to a transition section 20. As perhaps best seen in FIG. 2, the transition section 20 consists of two merging flights 21 and 22 of different pitches formed along a gradually decreasing diameter portion 23 of the hub 17. One flight 21 may be a continuation of the metering flight 13, whereas the other flight 22 is merged with the flight 21 adjacent the first metering section 18 and gradually diverges therefrom by reason of their different pitches. This results in a gradual decrease to zero in the axial width of the helical channel 25 formed by the flight 21 which is a continuation of the first metering channel 26, and a gradual increase in the axial width of the helical channel 27 between the merging flights 21 and 22 from zero adjacent the first metering section 18 to a maximum adjacent the end of the transition section.

Figure 3:
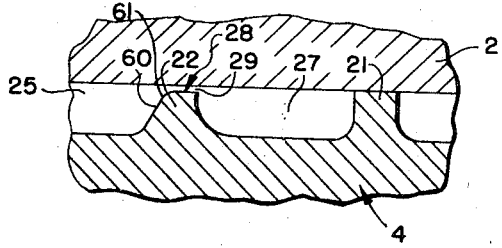
FIG. 3 is a partial radial section through the merging helical flights of the first stage transition section, taken on the plane of the line 3—3, FIG. 2.

Moreover, there is a restriction 28 between the helical channels 25 and 27 which as shown in FIG. 3 may be in the form of a slight but continuous clearance 29 between the outer peripheral surface of the flight 22 and the wall of the bore 3. Accordingly, as the material is advanced along the helical channel 25 from the first metering channel 26, the material is substantially compressed, worked, and heated until sufficiently refined to pass from the channel 25 to the channel 27 through the restriction 28.

The second stage 11 of the extruder 1 which receives the homogeneous melt from the first stage 10 may be of conventional design, consisting of a second feed section 35 formed by a continuation of the helical flight 13 along a uniform diameter portion 36 of the hub 17 which is substantially less than the diameter of the adjacent hub portion 23 at the end of the first stage 10 to permit ready acceptance of the material therefrom at substantially zero back pressure; a second compression section 38 comprising a further continuation of flight 13 along an outwardly tapered portion 39 of the hub 17; and a second metering section 40 which also comprises a continuation of flight 13 along a uniform diameter portion 41 of the hub 17. Since the material leaving the first stage 10 of the extruder 1 already has the desired melt consistency the second stage 11 is primarily used for cooling and pumping of the material (with slight additional working) through the breaker plate and screen assembly 7 and extruder die 8 at a uniform flow rate.

Figure 4:
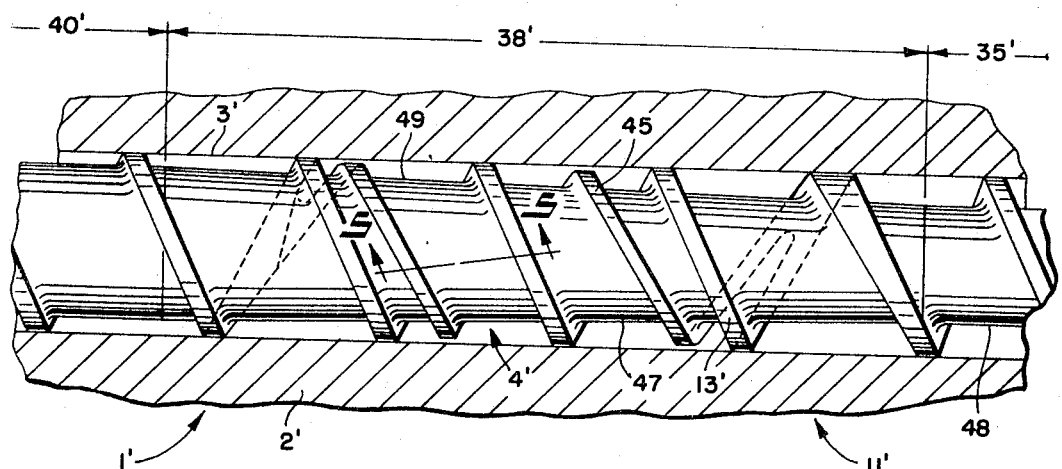
FIG. 4 is an enlarged partial side elevation view of the second stage of a modified form of feed screw in accordance with this invention with the cylinder wall shown in section.

Alternatively, the second compression section 38' may include an additional flight 45 as shown in the FIG. 4 embodiment of a greater pitch than that of the flight 13' to provide a second transition section having gradually diverging flights 13', 45 which are merged with each other adjacent the second feed section 35' and gradually diverge by reason of their different pitches. Thus, the helical channel 47 formed by the flight 13' as a continuation of the second feed section channel 48 progressively decreases in axial width and the helical channel 49 between the flights 13', 45 progressively increases from zero adjacent the second feed section 35' to a maximum near the end of the second transition section 38', similar to the helical channels 25 and 27, respectively, of the first stage transition section 20.

Figure 5:
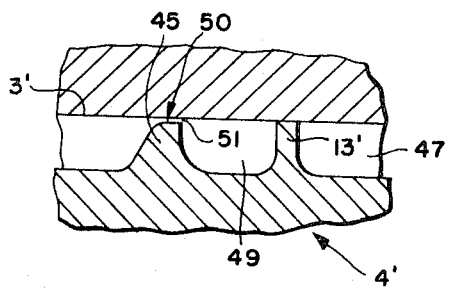
FIG. 5 is a partial radial section similar to FIG. 3 but through the merging helical flights of the second stage transition section of the modified feed screw of FIG. 4, taken on the plane of the line 5—5 thereof.

Also as in the first stage transition section 20, there is a restriction 50 (see especially FIG. 5) between the helical channels 47, 49 of the second transition section 38' in the form of a clearance 51 between the outer peripheral surface of the adidtional flight 45 and the wall of the bore 3', whereby the material received from the first stage 10 is further worked, heated, and refined as it is forced from the channel 47 to the channel 49 through the restriction 50. Otherwise, the construction of the extruder 1' of the FIG. 4 embodiment is substantially identical to that illustrated in FIGS. 1–3 and accordingly the same reference numbers followed by a prime (') symbol are used to designate like parts.

Figure 2:
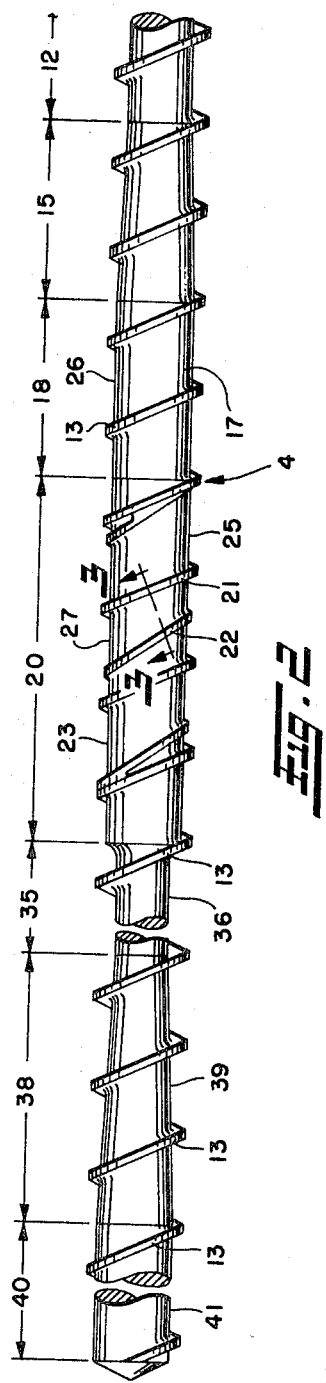
FIG. 2 is a partial side elevation view of the feed screw of FIG. 1 on an enlarged scale.

Tests were conducted using a first stage 3½ inch water cooled 14:1 L/D extruder having a transition section 20 immediately preceded by a compression section 15 and metering section 18 as in FIGS. 1 and 2 to extrude such materials as low density polyethylene, elastomeric polyvinyl chloride, and "Dow" 475 styrene at screw speeds of 50, 75 and 100 r.p.m., and in each instance the extruded material was of a very uniform consistency with a temperature variation of less than 2 degees at rates up to and exceeding 300 lbs./hr. In contrast, an equivalent screw without the transition section 20 would only produce a salable product up to 150 lbs./hr. Above that output rate there was an extremely wide temperature variation in the extruded material which increased rapidly with increased flows.

Additional tests were conducted separately using the second stage 11 of the FIG. 1 feed screw and the second stage 11' of the FIG. 4 feed screw as first stages with low density polyethylene to observe the mixing characteristics of each at different screw speeds, and then the stages 11 and 11' were assembled to make up a 24:1 L/D 2-stage extruder with the second stage 11 as the first stage and the second stage 11' as the second stage and similarly tested. At feed screw speeds of 50, 75 and 100 r.p.m., there was a substantial temperature variation in the extruded material from the stage 11' and an even greater temperature variation from the stage 11 when tested separately, but only a slight temperature variation of 4° F. at 100 r.p.m. when combined as aforesaid. These results clearly establish the importance of fluxing the material before passing it through a transition section of the type indicated at 38' in FIG. 4.

It is to be noted, however, that the temperature variation of the material emerging from the extruder having a second stage transition section 38' and a typical metering section first stage 11 was considerably higher than the substantially uniform temperature mix produced by the feed screw 4 of the FIGS. 1–3 embodiment. These improved results obtained by the feed screw 4 are believed to be due to the location of the transition section 20 in the first stage 10 where the temperature of the material is relatively low, with the compression section 15 and metering section 18 immediately preceding the transition section 20 to develop the necessary pressure and melt consistency of the material for flow through the transition section 20 without restricting the capacity of the extruder.

Although excellent results have been obtained using an extruder 1 with a conventional second stage in conjunction with the first stage 10 primarily for cooling and pumping the material from the first stage 10 as aforesaid, limited tests have shown that even better mixing of the material is obtained using the FIG. 4 extruder with transition sections 20 and 38' in the first and second stages, respectively.

There are a great many different extruder designs which may be developed with existing formulas using the principles of the present invention. However, the above mentioned uniform temperature mix was obtained using 3½ inch extruder 1 having a length/diameter ratio (L/D) of 24:1 and a feed screw 4 having the following dimensions:

FIRST STAGE 10

*Feed Section 12.*—Uniform diameter hub 17 for about 18" length having a flight 13 of 3½" pitch and ½" channel depth.

*Compression Section 15.*—Hub 17 tapers outwardly for about 8¾" to provide a channel depth that decreases from ½" to about .2" formed by a continuation of flight 13.

*Metering Section 18.*—Constant hub diameter for about 14" length having about .2" channel depth formed by continuation of flight 13.

*Transition Section 20.*—Hub 17 tapers for about 11½" length to provide increasing channel depth defined by continuation of flight 13 from about .2" to about .3", with an intermediate flight 22 having a clearance 29 of about .020" greater than the normal .005" clearance for flight 13 with an inclined leading face 60 of 30° and a rounded leading edge 61.

SECOND STAGE 11

*Second Feed Section 35.*—Uniform diameter hub for about 9 7/32" length and a 3/4" channel depth defined by continuation of flight 13.

*Second Compression Section 38.*—Tapered hub portion for 10½" length to provide channel depth from about 3/4" to about .2" defined by a continuation of flight 13.

*Second Metering Section 40.*—Uniform diameter hub portion for about 15¾" length having a .2" channel depth defined by continuation of flight 13.

The 30° inclined leading face 60 and rounded edge 61 of the intermediate flight 22 assists in feeding the refined material from the channel 25 to the channel 27. Moreover, the decreasing taper of the transition section hub portion 23 precludes back pressure from developing in the channel 27 downstream of the major flight 21 which could restrict the capacity of the extruder.

Although a clearance 29 for the intermediate flight 22 of .020" greater than the normal close clearance for flight 21 is indicated, this will vary with the type of material being extruded and the size of the extruder. For example, for a 3½" extruder using polyvinyl chloride powder as the material, a clearance of .010" plus the normal .005" flight clearance is desirable, whereas a .025" clearance plus .006" normal flight clearance is preferable for a 4½" extruder using polyethylene. However, satisfactory results may be obtained by having a clearance which varies from .015" to .040".

The feed screw 4' the of FIG. 4 embodiment may have a first stage 10 as outlined above, but the second stage 11' may be dimensioned as follows:

*Second feed section 35'.*—Uniform hub diameter for 10 3/32" length having a ½-inch channel depth formed by a continuation of flight 13'.

*Second transition section 38'.*—Outwardly tapering hub portion for 15" length to provide channel depth that decreases from about ½" to about ¼" defined by continuation of flight 13; and an intermediate flight 45 of having a 4 7/16" pitch and a clearance 51 of about .03" greater than the normal flight clearance of .005".

*Second metering section 40'.*—Uniform hub diameter for about 10½" length with a ¼" channel depth defined by a continuation of flight 13'.

In addition to the above, a vent 62 may be provided in the wall of the cylinder assembly 2 preferably in the region of the second feed section 35 where there is substantially zero pressure to expose the thin layer of refined material which is being forced from one channel 25 to the other channel 27 through the restriction 28 to the atmosphere or to a vacuum for removal of moisture and other volatile gases which could cause surface defects in the material.

Although exhaustive tests have not as yet been conducted, it is apparent from the results already obtained that extruders may be designed in accordance with the teachings of the present invention using existing formulas, and no material limitations have as yet been found. Moreover, a deeper design may be constructed to improve the lbs./hr./r.p.m. while improving temperature quality and keeping the r.p.m. to a minimum.

Other modes of applying the principles of the invention may be employed, change being made as regards the details described, provided the features stated in any of the following claims or the equivalent of such be employed.

We therefore particularly point out and distinctly claim as our invention:

1. In a multi-state extruder, a cylinder having an inlet for introduction of plastic and like materials; a feed screw rotatable in said cylinder for advancing material through said cylinder and plasticizing such material during the course of its flow, said feed screw having a first stage including a transition section at the downstream end of said first stage and a compression section followed by a metering section immediately preceding said transition section for supplying semi-fluxed material to said transition section; said feed screw in said transition section having a helical flight defining a first helical channel through which material is advanced from said metering section into said transition section, and a second helical flight defining a second helical channel adjacent said first channel, said second helical flight gradually diverging from said first helical flight to cause a progressively decreasing axial width in said first channel and a progressively increasing axial width in said second channel, and means providing restricted communication between said first and second channels for build-up of pressure in said first helical channel and flow of refined material from said first channel into said second channel; and a second stage downstream of said first stage through which the material received from said first stage is advanced.

2. The extruder of claim 1 further comprising a feed section in said first stage upstream of said compression section for feeding material to said compression section and metering section.

3. The extruder of claim 2 wherein said feed screw has a single helical flight extending the full length of said first stage feed, compression, and metering sections, said first helical flight in said first stage transition section also being an extension of said single helical flight.

4. The extruder of claim 1 wherein said means defining restricted communication between said first and second helical channels in said first stage transition section comprises a continuous clearance between the wall of said cylinder and the crest of said second helical flight.

5. The extruder of claim 4 wherein said continuous clearance between the wall of said cylinder and the crest of said second helical flight is from .015" to .040".

6. The apparatus of claim 1 wherein the hub of said feed screw in the region of said first transition section tapers to provide a progressively increasing radial depth for said first and second helical channels from beginning to end.

7. The extruder of claim 6 wherein said second stage includes a second transition section similar to said first stage transition section except that the adjacent channels in said second stage transition section are of progressively decreasing radial depth from beginning to end.

8. The extruder of claim 4 wherein said second helical flight has an inclined leading face and rounded edge to assist in feeding the material from said first helical channel to said second helical channel.

9. A multi-stage extruder comprising a cylinder having an inlet for introduction of plastic and like material, a feed screw rotatable in said cylinder effective upon rotation of said feed screw to advance material through said cylinder and plasticize such material during the course of flow, said feed screw having a first stage including successive feed, compression, metering, and transition sections in the direction of advance of the material, said feed screeew having a first helical flight extending the full length of said first stage which defines a first helical channel through which the material is advanced, and a second helical flight in said transition section which defines a second helical channel adjacent said first helical channel, said first and second helical flights being of different pitches in said transition section thus to cause said first helical channel to progressively decrease in axial width in said transition section and said second channel to progressively increase in axial width, means defining a restriction between said first and second channels in said transition section for build-up of pressure in said first helical channel in said transition section and flow of refined material from said first channel into said second channel, and a second stage downstream of said first stage, said first helical flight and thus said first helical channel also extending the full length of said second stage through which the material received from said first stage is advanced.

10. The extruder of claim 1 wherein said second stage includes successive feed, compression, and metering sections in the direction of advance of the material for cooling and pumping of the refined material received from said first stage.

11. The extruder of claim 10 wherein said feed screw in said second stage feed section has a helical flight which defines a helical channel whose radial depth is substantially greater than the radial depth of said second helical channel in said first stage transition section, whereby there is substantially zero pressure in said second stage feed section, and means are provided in said second stage feed section for venting the refined material as it is being forced from said first channel to said second channel in said first stage transition section through said restriction means.

12. The extruder of claim 1 wherein said second stage includes a second transition section similar to said first stage transition section for additionally refining the material as it is advanced through said second stage.

References Cited
UNITED STATES PATENTS

| | | |
|---|---|---|
| 3,023,456 | 3/1962 | Palfey. |
| 3,123,860 | 3/1964 | Vesilind. |
| 3,248,469 | 4/1966 | Kosinsky et al. |
| 3,271,819 | 9/1966 | Lacher. |
| 3,300,810 | 1/1967 | Gregory et al. |

FOREIGN PATENTS

| | | |
|---|---|---|
| 1,251,409 | 12/1960 | France. |
| 1,012,766 | 8/1965 | Great Britain. |

WILLIAM J. STEPHENSON, *Primary Examiner.*